United States Patent
Gerber et al.

(10) Patent No.: US 8,948,043 B2
(45) Date of Patent: Feb. 3, 2015

(54) METHOD AND APPARATUS FOR NORMALIZING CELLULAR COMMUNICATIONS NETWORK DATA

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Zhaoguang Wang, Ann Arbor, NJ (US)

(73) Assignees: AT&T Intellectual Property I, L.P., Atlanta, GA (US); University of Michigan, Ann Arbor, MI (US)

( * ) Notice: Subject to any disclaimer, the term of this patent is extended or adjusted under 35 U.S.C. 154(b) by 566 days.

(21) Appl. No.: 12/874,702

(22) Filed: Sep. 2, 2010

(65) Prior Publication Data

US 2012/0057571 A1 Mar. 8, 2012

(51) Int. Cl.
*H04L 12/26* (2006.01)
*H04W 76/04* (2009.01)

(52) U.S. Cl.
CPC ............ *H04L 43/04* (2013.01); *H04W 76/046* (2013.01); *H04L 43/106* (2013.01)
USPC ........... 370/253; 370/401; 370/392; 370/389; 370/394; 370/474

(58) Field of Classification Search
USPC ......... 370/328, 329, 338, 348, 349, 392, 394, 370/374, 350, 508, 519, 401
See application file for complete search history.

(56) References Cited

U.S. PATENT DOCUMENTS

| | | | |
|---|---|---|---|
| 6,690,683 B1 * | 2/2004 | Brunheroto et al. .......... 370/542 |
| 7,461,185 B2 * | 12/2008 | Ebata et al. ..................... 710/52 |
| 7,489,706 B2 * | 2/2009 | Hatley et al. .................. 370/469 |
| 7,525,982 B2 * | 4/2009 | Kramer et al. ................ 370/431 |
| 7,613,740 B2 * | 11/2009 | Holenstein et al. ........... 707/615 |
| 7,664,057 B1 * | 2/2010 | Wu et al. ....................... 370/260 |
| 7,688,828 B2 * | 3/2010 | Chapman et al. ........ 370/395.21 |
| 7,986,624 B2 * | 7/2011 | Thesling .................... 370/230.1 |
| 2002/0129158 A1 * | 9/2002 | Zhang et al. .................. 709/234 |
| 2003/0223422 A1 * | 12/2003 | Igarashi et al. ............... 370/390 |
| 2005/0064845 A1 * | 3/2005 | Clingerman et al. ......... 455/408 |
| 2005/0265338 A1 * | 12/2005 | Chapman et al. ............. 370/389 |
| 2005/0286564 A1 * | 12/2005 | Hatley et al. .................. 370/503 |
| 2006/0029080 A1 * | 2/2006 | Kappler et al. ............. 370/395.4 |
| 2006/0176846 A1 * | 8/2006 | Miki et al. .................... 370/328 |
| 2006/0187876 A1 * | 8/2006 | Schmidl et al. .............. 370/328 |
| 2007/0124490 A1 * | 5/2007 | Kalavade et al. ............. 709/230 |
| 2007/0286195 A1 * | 12/2007 | Ilnickl et al. .................. 370/392 |
| 2008/0212517 A1 * | 9/2008 | Thesling ....................... 370/316 |
| 2009/0185574 A1 * | 7/2009 | Chapman et al. ............. 370/419 |
| 2010/0169392 A1 * | 7/2010 | Lev Ran et al. .............. 707/827 |
| 2011/0122783 A1 * | 5/2011 | Lin et al. ....................... 370/252 |
| 2012/0057571 A1 * | 3/2012 | Gerber et al. ................. 370/338 |

* cited by examiner

*Primary Examiner* — Afshwan Towfighi
*Assistant Examiner* — Phong La

(57) ABSTRACT

A method, computer readable medium and apparatus for normalizing cellular communications network data are disclosed. For example, the method collects a data packet from the cellular communications network, modifies a time stamp of the data packet in accordance with a promotion delay time from the time stamp of the data packet to create a normalized data packet and processes the normalized data packet to optimize state machine configurations.

18 Claims, 6 Drawing Sheets

METHOD AND APPARATUS FOR NORMALIZING CELLULAR COMMUNICATIONS NETWORK DATA

BACKGROUND

In a cellular network, for example a universal mobile telecommunications system (UMTS) 3G network, data can be collected for further study. However, the data collected may be considered "raw" data and cannot be used for further processing. This is because the "raw" data may skew analysis of the data or provide inaccurate results when the "raw" data is processed further.

SUMMARY

In one embodiment, the present disclosure teaches a method, computer readable medium and apparatus for normalizing cellular communications network data. In one embodiment, the method comprises collecting a data packet from the cellular communications network, modifying a time stamp of the data packet in accordance with a promotion delay time from the time stamp of the data packet to create a normalized data packet and processing the normalized data packet to optimize state machine configurations.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
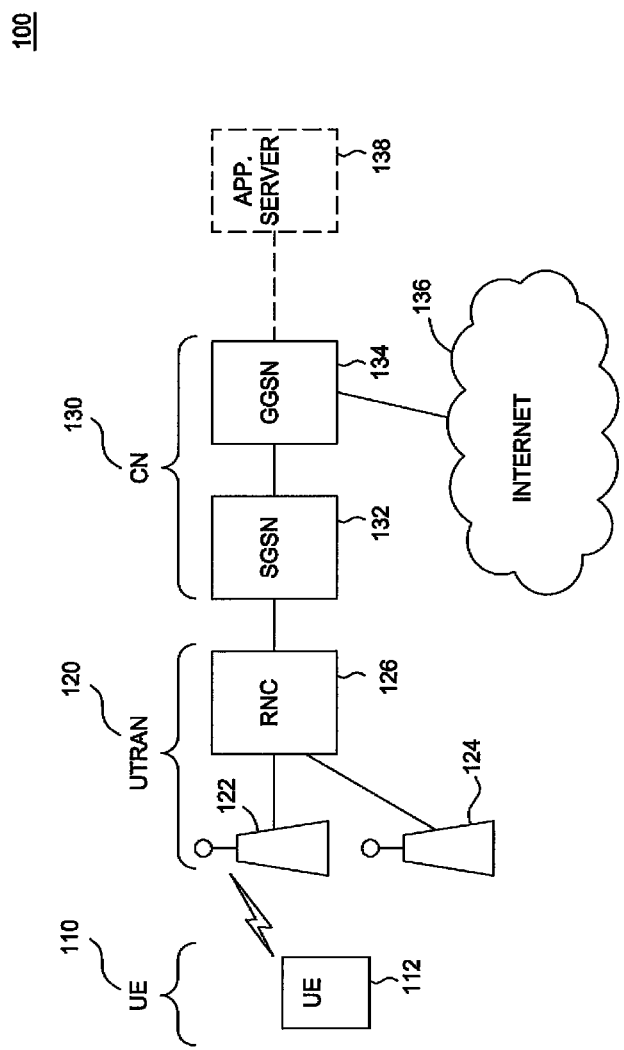
FIG. 1 illustrates one example of a cellular communications network architecture.

The present disclosure broadly discloses a method, computer readable medium and an apparatus for normalizing cellular communications network data. FIG. 1 is a block diagram depicting one example of a cellular communications network 100 related to the current disclosure. In one embodiment, the cellular communications network may be a 3G cellular network such as a universal mobile telecommunications system (UMTS) network. However, it should be noted that the cellular communications network 100 may include other types of cellular communications networks such as general packet radio services (GPRS) networks, global system for mobile communication (GSM) networks or enhanced data rates for GSM evolution (EDGE) network by substituting the appropriate hardware and/or hardware configurations for the respective networks.

FIG. 1 is a block diagram depicting an exemplary cellular communications network 100 related to the current disclosure. In one embodiment, the network 100 includes three subsystems comprising a user equipment (UE) subsystem 110, a UMTS terrestrial radio access network (UTRAN) subsystem 120 and a core network 130.

In one embodiment, the UE subsystem 110 includes one or more user endpoint devices 112. The user endpoint devices 112 may include a mobile telephone, a smart phone, a messaging device, a tablet computer, a laptop computer, an air card and the like. The user endpoint devices 112 may communicate wirelessly with the cellular communications network 100.

In one embodiment, the UTRAN subsystem 110 includes one or more base stations 122 and 124 and a radio network controller (RNC) 126. The UTRAN subsystem 110 provides connectivity between the user endpoint devices 112 and the core network 130. The UTRAN subsystem 110 provides features such as packet scheduling, radio resource control (RRC) and handover control via the RNC 126.

In one embodiment, the core network 130 includes a serving GPRS support node (SGSN) 132, a gateway GPRS support node (GGSN) 134 and the Internet 136. The GGSN 134 serves as a gateway hiding UMTS internal infrastructures from an external network.

In addition, the core network 130 may optionally include an application server 138. The application server 138 may be internal or external to the core network 130. The core network 130 is the backbone of the cellular communications network 100. It should be noted that although various numbers of hardware equipment is illustrated that the numbers illustrated should not be limiting. For example, although two base stations 122 and 124 are illustrated the network 100 may include any number of base stations. Moreover, the cellular communications network 100 may also include additional hardware or network components that are not illustrated. In other words, FIG. 1 illustrates a simplified cellular communications network 100.

With reference to the cellular communications network 100, when data packets are transmitted across the network 100, the data packets may be collected and a time stamp may be recorded for each of the data packets. In one embodiment, the data packets may be collected by the SGSN 132, the GGSN 134 or the application server 138. In one embodiment, the time stamps may be recorded by the SGSN 132, the GGSN 134 or the application server 138.

For simplicity, for further discussion it will be assumed that the data packets are collected by and the time stamps are recorded by the GGSN 134. However, it should be noted that the embodiments below can be equally applied to when the data packets are collected by and the time stamps are recorded by the SGSN 134 or the application server 138.

When the time stamps for the data packets are recorded by the GGSN 134, the time stamps may be different than time stamps that are recorded by the RNC 126 due to promotion delays introduced by RRC state machines. Unfortunately, the time stamps collected at the GGSN 134 that are used for further processing or analysis are polluted by the promotion delays. Ideally, the time stamps collected at the GGSN 134 should be the same as the time stamps recorded at the RNC 126 for providing accurate results when analyzing the collected data packets.

Figure 5:
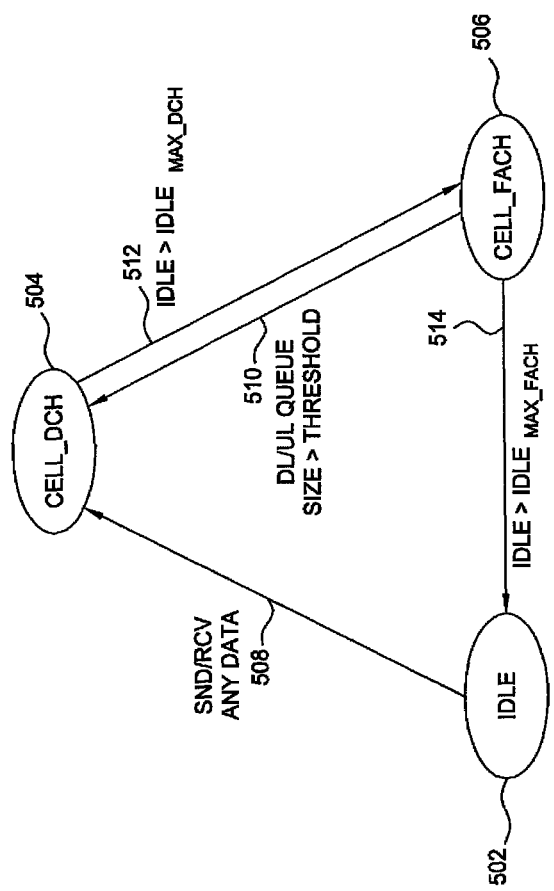
FIG. 5 illustrates one example of a radio resource control state machine.

FIG. 5 illustrates one example of an RRC state machine 500 implemented by the RNC 126. It should be noted that the RRC state machine 500 is only one example of a state machine used in the cellular communications network 100. The embodiments of the present disclosure may be equally applicable to other variations of RRC state machines. A brief discussion of the RRC state machine 500 will be helpful in defining what is meant by a promotion and a promotion delay time.

The RRC state machine 500 comprises three states; an idle state 502, a CELL_DCH state 504 and a CELL_FACH state 506. In one embodiment, the idle state 502 is a default state wherein no radio resources are allocated and the user endpoint device 112 cannot transfer any data. Little to no energy is consumed by the user endpoint device 112 in the idle state 502.

In one embodiment, the CELL_DCH state 504 is the highest speed of data transfer, maximum bandwidth and highest amount of energy consumption. An RRC connection is established and the user endpoint device 112 is allocated dedicated transport channels in both a downlink and an uplink direction.

In one embodiment, the CELL_FACH state 506 is a lower level of access and consumes less energy than the CELL_DCH state 504. An RRC connection is established, but there is no dedicated channel allocated to the user endpoint device 112. Instead, the user endpoint device 112 can only transmit data through shared low-speed channels.

In the RRC state machine 500, promotions and demotions may occur between the idle state 502, the CELL_DCH state 504 and the CELL_FACH state 506. For example, a promotion may be defined as moving to a higher level of access, e.g., from the idle state 502 to the CELL_DCH state 504 or from the CELL_FACH state 506 to the CELL_DCH state 504. For example, a demotion may be defined as moving to a lower level of access, e.g., from the CELL_DCH state 204 to the CELL_FACH state 206 or from the CELL_FACH state 206 to the idle state 202.

FIG. 5 illustrates how promotions and demotions may occur. For example, when in the idle state 502, when any data is sent or received, a promotion may occur to the CELL_DCH state 504. This is illustrated by line 508. Alternatively, when in the CELL_FACH state 506 if the downlink or uplink queue size is greater than a predetermined threshold, a promotion may occur to the CELL_DCH state 504. This is illustrated by line 510.

However, when in the CELL_DCH state 504, an amount of idle time exceeds a maximum DCH idle time, $IDLE_{MAX\_DCH}$, (e.g., 5 seconds) then a demotion may occur to the CELL_FACH state 506. This is illustrated by line 512. Alternatively, when in the CELL_FACH state 506 if the amount of idle time exceeds a maximum FACH idle time, $IDLE_{MAX\_FACH}$, (e.g. 12 seconds) then a demotion may occur to the idle state 502. This is illustrated by line 514.

It should be noted that the CELL_DCH idle time and the CELL_FACH idle time may be set to any amount of time. The times are provided only as examples and should not be considered limiting.

It should be noted that promotions involve more work than demotions. For example, state promotions incur a long "ramp-up" latency of up to two seconds during which many control messages are exchanged between the user endpoint device 112 and the RNC 126 for resource allocation (e.g., radio bearer reconfiguration and RRC connection setup). Thus, the "ramp-up" during a promotion creates a promotion time delay.

Thus, whenever a promotion occurs in the RRC state machine 500 a promotion delay time pollutes the actual time stamps collected by the GGSN 134. In other words, due to the pollution of the time stamps by the promotion delay times, the time stamps recorded by the GGSN 134 and the RNC 126 are not the same.

As a result, the time stamps of the data packets recorded by the GGSN 134 must be normalized. In other words, the time stamps of the data packets must be modified in accordance with the promotion delay time. How the time stamps of the data packets are modified depends on whether the data packets are uplink packets or downlink packets.

Figure 2:
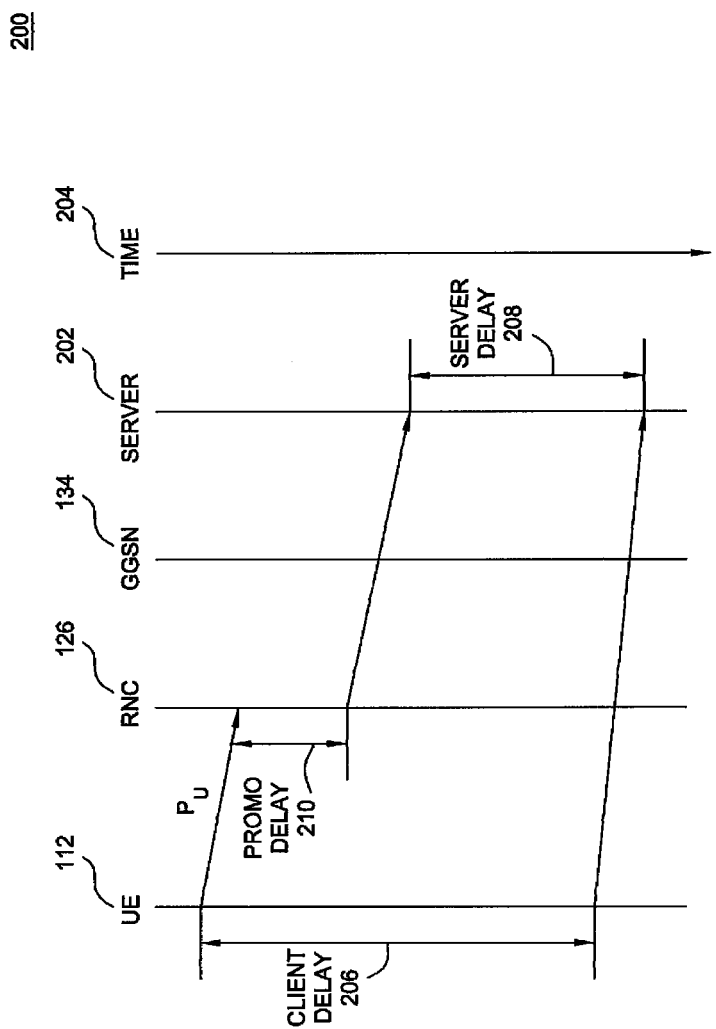
FIG. 2 illustrates one example of a uplink packet timing diagram.

FIG. 2 illustrates a timing diagram 200 for uplink data packets. Uplink data packets are packets that travel from a user endpoint device to a server. The timing diagram 200 includes the user endpoint device 112, the RNC 126, the GGSN 134, a server 202 in the Internet 136 that the user endpoint device 112 is trying to access via the cellular communications network 100 and a time line 204.

The timing diagram 200 begins when an uplink data packet ($P_u$) is transmitted by the user endpoint device 112. When the uplink data packet $P_u$ arrives at the RNC 126, the RNC 126 records a time stamp. However, the uplink data packet $P_u$ causes a promotion to occur as illustrated by the RRC state machine 500 illustrated in FIG. 5. As discussed with reference to FIG. 5, the promotion creates a promotion delay time, as illustrated by line 210 in FIG. 2. The uplink data packet $P_u$ is subsequently transmitted to the GGSN 134.

The GGSN 134 records a time stamp when the uplink data packet $P_u$ is collected. Notably, the GGSN 134 receives the uplink data packet $P_u$ after the promotion occurs. As a result, the time stamp at the GGSN 134 is polluted by the promotion delay time 210 introduced by the promotion that occurred at the RNC 126.

Thus, in one embodiment, to normalize the uplink data packets, the time stamp recorded by the GGSN 134 must be adjusted in accordance with the promotion delay time 210. For example, for uplink data packets illustrated in FIG. 2, the modification comprises subtracting the promotion delay time 210 from the time stamp of the uplink data packet recorded by the GGSN 134. As a result, the time stamp for the normalized data packet collected at the GGSN 134 would be the same as the time stamp recorded by the RNC 126. Thus, processing or analyzing the normalized data packet will provide accurate results.

Subsequently, the uplink data packet $P_u$ is forwarded to the server 202. An overall client delay is illustrated by line 206 and an overall server delay is illustrated by line 208.

Figure 3:
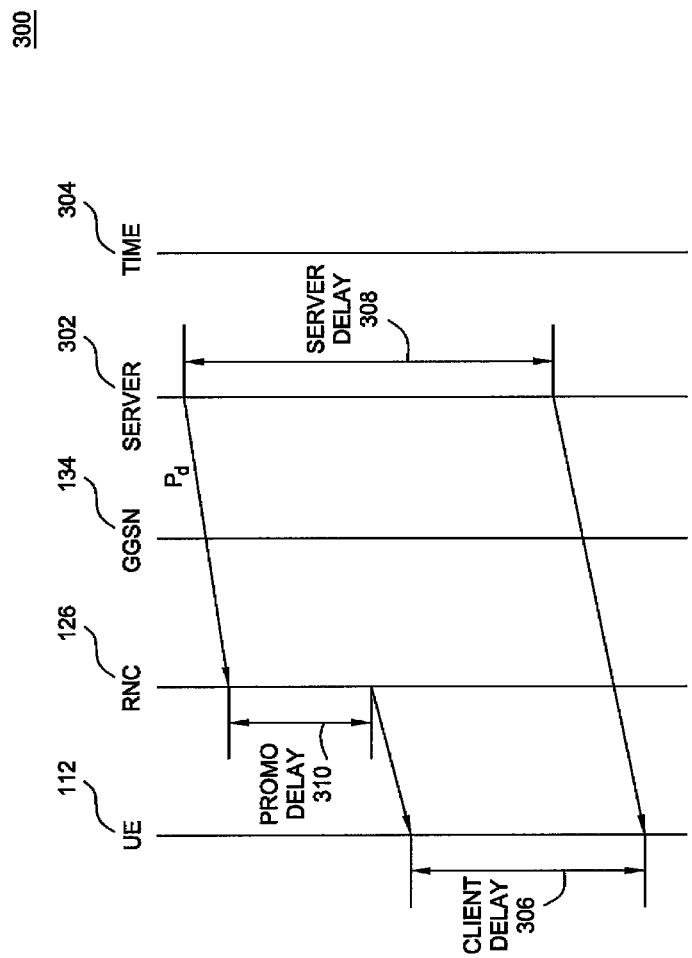
FIG. 3 illustrates one example of a downlink packet timing diagram.

FIG. 3 illustrates a timing diagram 300 for downlink data packets. Downlink data packets are packets that travel from a user endpoint device to a server. The timing diagram 300 includes the user endpoint device 112, the RNC 126, the GGSN 134, a server 302 in the internet 136 that the user endpoint device 112 is trying to access via the cellular communications network 100 and a time line 304.

The timing diagram 300 begins when a downlink data packet ($P_d$) is transmitted by the server 304 towards the user endpoint device 112. When the downlink data packet $P_d$ arrives at the GGSN 134 from the server 304, the GGSN 134 records a time stamp for the downlink data packet $P_d$. Notably, in the downlink embodiment, the GGSN 134 records a time stamp before the promotion occurs.

Subsequently, the GGSN 134 forwards the downlink data packet $P_d$ to the RNC 126. However, as illustrated by the RRC state machine 500 in FIG. 5, when the user endpoint device 112 receives any data packet a promotion occurs. As a result, a promotion delay time 310 is introduced. The RNC 126 records a time stamp that includes the promotion delay time 310.

Thus, in one embodiment, to normalize the downlink data packets, the time stamp recorded by the GGSN 134 must be adjusted in accordance with the promotion delay time 310. For example, for downlink data packets illustrated in FIG. 3, the modification comprises adding the promotion delay time 310 to the time stamp of the downlink data packet recorded by the GGSN 134. As a result, the time stamp for the normalized data packet collected at the GGSN 134 would be the same as the time stamp recorded by the RNC 126. Thus, processing or analyzing the normalized data packet will provide accurate results.

Subsequently, the RNC 126 forwards the downlink data packet $P_d$ to the user endpoint device 112. An overall client delay is illustrated by line 306 and an overall server delay is illustrated by line 308.

Figure 4:
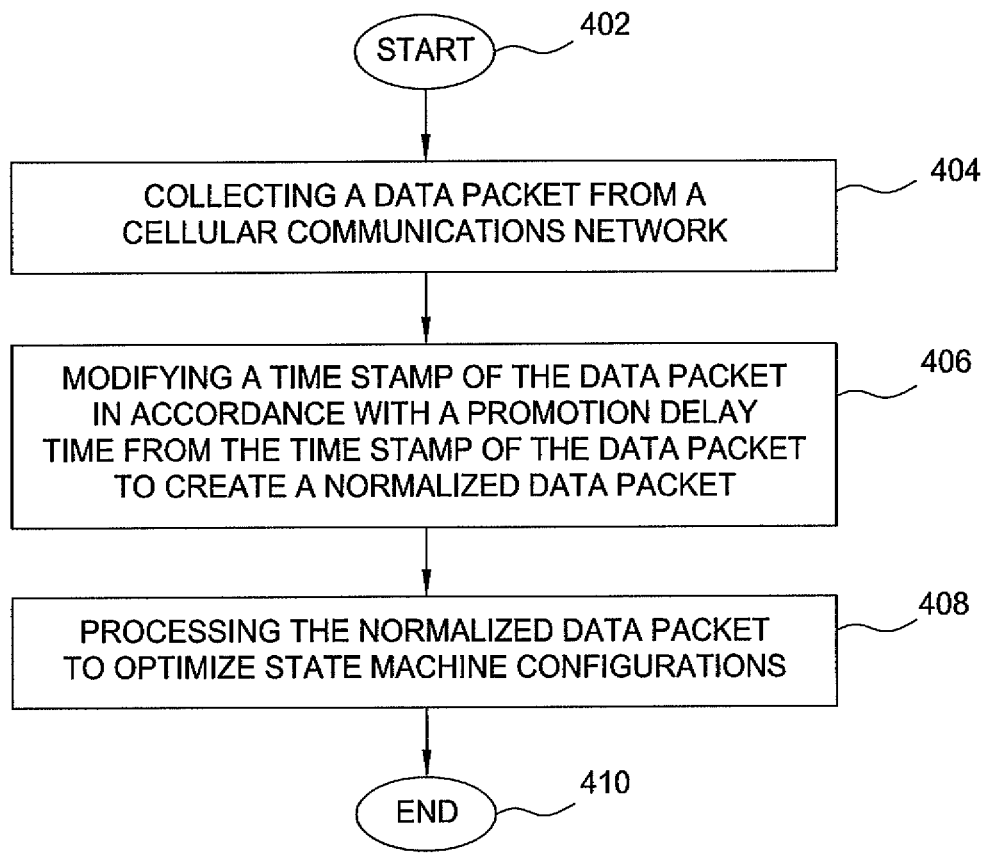
FIG. 4 illustrates a flowchart of a method for normalizing cellular network data.

FIG. 4 illustrates a flowchart of a method 400 for normalizing cellular network communications data. In one embodiment, one or more steps of the method 400 can be implemented by the SGSN 132, the GGSN 134, the application server 138 or a general purpose computer having a processor, a memory and input/output devices as discussed below with reference to FIG. 6. In one embodiment, all the steps of method 400 may be performed by a single hardware device. In another embodiment, one or more steps of method 400 may be performed by different hardware devices. For example, the GGSN 134 may collect the data packets and the application server 138 may modify the data packets to save processing resources of the GGSN 134.

The method 400 begins at step 402. At step 404, the method 400 collects a data packet from a cellular communications network. It should be noted that method 400 may collect more than one data packet. In other word, a data packet should be interpreted as including one or more data packets.

At step 406, the method 400 modifies a time stamp of the data packet in accordance with a promotion delay time from the time stamp of the data packet to create a normalized data packet. As discussed above, when a promotion occurs in the RRC state machine, a promotion delay time affects a time stamp recorded by the RNC and the GGSN. As a result, depending on whether the data packet is an uplink data packet or a downlink data packet, the promotion delay time must subtracted or added to the time stamp recorded by the GGSN accordingly.

At step 408, the method 400 processes the normalized data packet to optimize state machine configurations. For example, a new state machine may be created based upon the processing of the normalized data packet. Thus, the new optimal state machine may be implemented by the RNC 126.

In one embodiment, optimizing may be defined as finding the best configuration that balances radio resources, user endpoint device energy consumption and end user experience. For example, the state machine may be optimized by adjusting the threshold times for the idle timers for each of the states illustrated in FIG. 5 or determining whether dynamic idle times would be more efficient than static idle times. In other words, in one embodiment, processing the normalized data packet to optimize state machine configurations may involve executing simulations with the normalized data packets to find the best threshold times for the RRC state machine. The method 400 ends at step 410.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 6:
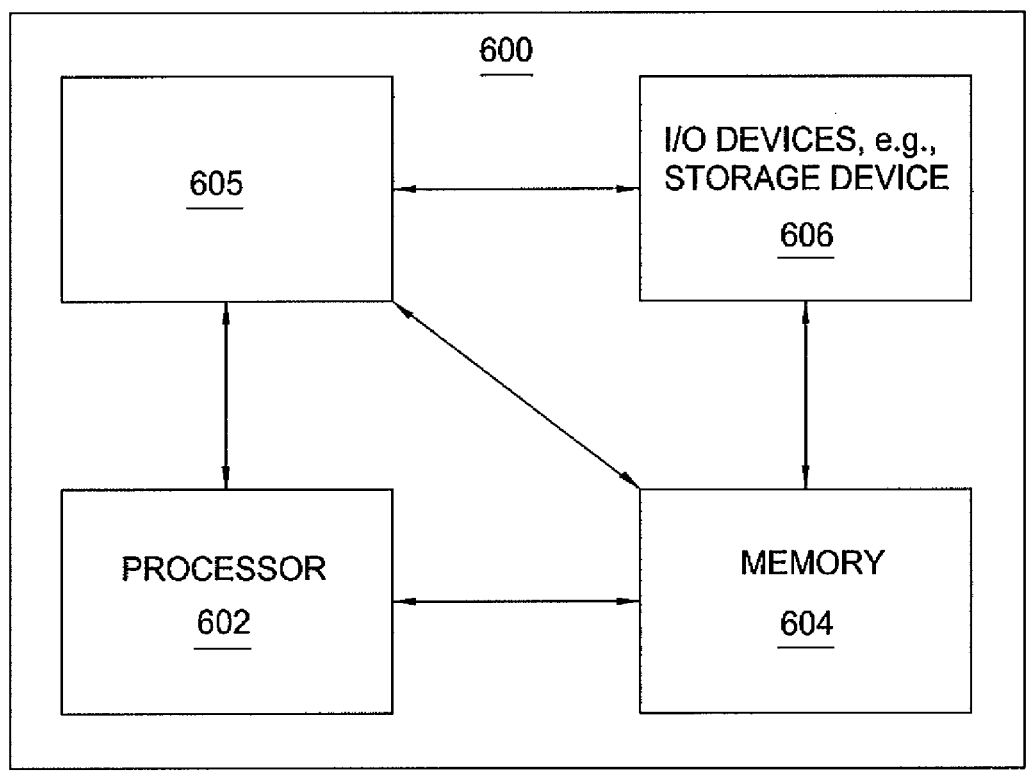
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for normalizing cellular network data, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 605 for normalizing cellular network data can be loaded into memory 604 and executed by processor 602 to implement the functions as discussed above. As such, the present method 605 for normalizing cellular network data (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for normalizing cellular communications network data, comprising:
    collecting, by a processor, a data packet from the cellular communications network;
    modifying, by the processor, a time stamp of the data packet in accordance with a promotion delay time from the time stamp of the data packet to create a normalized data packet, wherein the promotion delay time comprises a delay associated with a promotion to a higher level of access in a radio resource control state machine, wherein the data packet is collected by and the time stamp is recorded by the processor of a gateway general packet radio services support node; and
    processing, by the processor, the normalized data packet to optimize state machine configurations.

2. The method of claim 1, wherein the data packet is an uplink data packet traveling from a user endpoint device to a server.

3. The method of claim 2, wherein modifying the time stamp of the uplink data packet comprises:
    subtracting the promotion delay time from the time stamp of the uplink data packet.

4. The method of claim 1, wherein the data packet is a downlink data packet traveling from a server to a user endpoint device.

5. The method of claim 4, wherein modifying the time stamp of the downlink data packet comprises:
    adding the promotion delay time from the time stamp of the downlink data packet.

6. The method of claim 1, wherein the promotion delay is introduced by a promotion that occurs based upon a radio resource control state machine of a radio network controller.

7. The method of claim 1, wherein the processing comprises creating a new state machine based upon the processing of the normalized data packet.

8. A non-transitory computer-readable medium storing a plurality of instructions which, when executed by a processor, cause the processor to perform operations for normalizing cellular communications network data, the operations comprising:

collecting a data packet from the cellular communications network;

modifying a time stamp of the data packet in accordance with a promotion delay time from the time stamp of the data packet to create a normalized data packet, wherein the promotion delay time comprises a delay associated with a promotion to a higher level of access in a radio resource control state machine, wherein the data packet is collected by and the time stamp is recorded by the processor of a gateway general packet radio services support node; and processing the normalized data packet to optimize state machine configurations.

9. The non-transitory computer-readable medium of claim 8, wherein the data packet is an uplink data packet traveling from a user endpoint device to a server.

10. The non-transitory computer-readable medium of claim 9, wherein modifying the time stamp of the uplink data packet comprises: subtracting the promotion delay time from the time stamp of the uplink data packet.

11. The non-transitory computer-readable medium of claim 8, wherein the data packet is a downlink data packet traveling from a server to a user endpoint device.

12. The non-transitory computer-readable medium of claim 11, wherein modifying the time stamp of the downlink data packet comprises: adding the promotion delay time from the time stamp of the downlink data packet.

13. The non-transitory computer-readable medium of claim 8, wherein the promotion delay is introduced by a promotion that occurs based upon a radio resource control state machine of a radio network controller.

14. The non-transitory computer-readable medium of claim 8, wherein the processing comprises creating a new state machine based upon the processing of the normalized data packet.

15. An apparatus for normalizing cellular communications network data, comprising:
a processor; and
a computer-readable medium storing a plurality of instructions which, when executed by the processor, cause the processor to perform operations, the operations comprising:
collecting a data packet from a cellular communications network;

modifying a time stamp of the data packet in accordance with a promotion delay time from the time stamp of the data packet to create a normalized data packet, wherein the promotion delay time comprises a delay associated with a promotion to a higher level of access in a radio resource control state machine, wherein the data packet is collected by and the time stamp is recorded by the processor of a gateway general packet radio services support node; and processing the normalized data packet to optimize state machine configurations.

16. The apparatus of claim 15, wherein the data packet is an uplink data packet traveling from a user endpoint device to a server and wherein the modifying the time stamp of the uplink data packet comprises:
subtracting the promotion delay time from the time stamp of the uplink data packet.

17. The apparatus of claim 15, wherein the data packet is a downlink data packet traveling from a server to a user endpoint device and wherein the modifying the time stamp of the downlink data packet comprises:
adding the promotion delay time from the time stamp of the downlink data packet.

18. The apparatus of claim 15, wherein the processing comprises creating a new state machine based upon the processing of the normalized data packet.

* * * * *